(12) United States Patent
Amersfoort

(10) Patent No.: US 11,794,434 B2
(45) Date of Patent: Oct. 24, 2023

(54) SEPARATING MACHINE

(71) Applicant: Provisur Technologies, Inc., Chicago, IL (US)

(72) Inventor: André Amersfoort, Montfoort (NL)

(73) Assignee: Provisur Technologies, Inc., Chicago, IL (US)

( * ) Notice: Subject to any disclaimer, the term of this patent is extended or adjusted under 35 U.S.C. 154(b) by 331 days.

(21) Appl. No.: 17/090,398

(22) Filed: Nov. 5, 2020

(65) Prior Publication Data

US 2021/0138752 A1     May 13, 2021

Related U.S. Application Data

(60) Provisional application No. 62/933,325, filed on Nov. 8, 2019.

(51) Int. Cl.
*A22C 17/00* (2006.01)
*A22C 17/04* (2006.01)
(Continued)

(52) U.S. Cl.
CPC ............ *B30B 9/241* (2013.01); *A22C 17/004* (2013.01); *A22C 17/04* (2013.01); *A22C 25/16* (2013.01)

(58) Field of Classification Search
CPC ....... B30B 9/241; A22C 17/004; A22C 17/04; A22C 25/16; A22C 17/00; B07B 1/22; B07B 1/18
(Continued)

(56) References Cited

U.S. PATENT DOCUMENTS 3,396,768 A    8/1968   Kurihara
3,734,000 A *  5/1973   Ziener .................... B30B 9/241
                                                    100/153
(Continued)

FOREIGN PATENT DOCUMENTS

AT        202034 T     6/2001
AU        3148700 A    7/2000
(Continued)

OTHER PUBLICATIONS

International Search Report issued in application No. PCT/US2021/034092 dated Sep. 14, 2021. (13 pages).
(Continued)

*Primary Examiner* — Gene O Crawford
*Assistant Examiner* — Muhammad Awais
(74) *Attorney, Agent, or Firm* — Klintworth & Rozenblat IP LLP

(57) ABSTRACT

A separating machine separates a food source material into first and second food portions. The separating machine a separating arrangement with a roller assembly; a belt assembly including a belt; a drum assembly including a drum, and holes extending between the surfaces of the drum. The drum assembly is arranged proximate to the belt assembly to define a separation area. The belt assembly is arranged relative to the belt assembly such that the food source material delivered by the inlet assembly into the separation area is pressed by the belt against the outer surface of the drum and the first food portion is pressed through the holes into the drum interior, thereby separating the first and second food portions. The separating machine further includes a belt tensioning device configured to reposition at least a portion of the roller assembly to adjust a tension of the belt.

20 Claims, 12 Drawing Sheets

(51) Int. Cl.
    *A22C 25/16*    (2006.01)
    *B30B 9/24*    (2006.01)

(58) Field of Classification Search
    USPC .......................................................... 209/606
    See application file for complete search history.

(56) References Cited

U.S. PATENT DOCUMENTS

| | | | |
|---|---|---|---|
| 3,829,931 | A | 8/1974 | Suerbaum |
| 3,897,341 | A * | 7/1975 | Ozawa ................. B01D 33/073 100/118 |
| 4,156,384 | A | 5/1979 | Hinds, Jr. et al. |
| 4,232,051 | A * | 11/1980 | Hinds, Jr. ............... B30B 9/241 426/582 |
| 4,348,290 | A | 9/1982 | Schipper |
| 4,637,094 | A | 1/1987 | Matsubayashi |
| 4,710,271 | A | 12/1987 | Miller |
| 4,826,595 | A * | 5/1989 | Franke .................... B30B 9/241 210/405 |
| 4,877,487 | A | 10/1989 | Miller |
| 4,899,890 | A * | 2/1990 | Ewing .................... A22C 17/04 209/699 |
| 4,927,528 | A | 5/1990 | Doppstadt |
| 4,963,259 | A | 10/1990 | Barcomb et al. |
| 5,085,140 | A * | 2/1992 | Kunig .................... A22C 17/04 100/162 R |
| 5,205,777 | A | 4/1993 | Hohenester |
| 5,241,901 | A * | 9/1993 | Kunig .................... A22C 25/00 100/153 |
| 5,385,244 | A * | 1/1995 | Kunig .................... A22C 17/04 100/153 |
| 5,507,689 | A * | 4/1996 | McFarland ............ A22C 17/04 452/138 |
| 5,674,117 | A * | 10/1997 | Kunig .................... B30B 9/241 15/93.1 |
| 5,823,866 | A | 10/1998 | Kunig |
| 5,873,775 | A * | 2/1999 | Landahl ................. B30B 9/241 452/138 |
| 5,894,791 | A * | 4/1999 | Rose ....................... B30B 9/241 100/153 |
| 5,947,810 | A | 9/1999 | Magnasco et al. |
| 6,604,991 | B1 | 8/2003 | Jurs et al. |
| 6,843,714 | B2 | 1/2005 | Jurs et al. |
| RE40,085 | E | 2/2008 | Jurs et al. |
| RE41,409 | E | 6/2010 | Jurs et al. |
| 8,689,682 | B2 * | 4/2014 | Rose ....................... A23N 4/08 210/402 |
| 9,039,498 | B2 | 5/2015 | Schwarz |
| 9,089,876 | B2 | 7/2015 | Hoppe |
| 10,376,893 | B2 | 8/2019 | Evers |
| 2007/0217898 | A1 * | 9/2007 | Goodrich ............. F15B 20/004 414/539 |
| 2010/0084319 | A1 * | 4/2010 | Hahn ...................... B30B 9/241 474/214 |
| 2013/0129887 | A1 * | 5/2013 | Hoppe .................... B07B 1/24 209/235 |
| 2014/0061008 | A1 * | 3/2014 | Haythornthwaite ... B65G 15/34 264/255 |
| 2018/0027848 | A1 | 2/2018 | Blaine et al. |
| 2018/0029246 | A1 | 2/2018 | Blaine et al. |
| 2021/0037837 | A1 * | 2/2021 | Günther ................. A22C 17/04 |

FOREIGN PATENT DOCUMENTS

| | | | | |
|---|---|---|---|---|
| BR | 112015001455 | A2 | 7/2017 | |
| BR | PI0808910 | B1 | 6/2018 | |
| BY | 22029 | C1 | 6/2018 | |
| CA | 2131403 | C | 3/1995 | |
| CA | 2338947 | C | 2/2000 | |
| CA | 2853882 | C | 5/2013 | |
| CA | 3032041 | A1 | 2/2018 | |
| CA | 3032196 | A1 | 2/2018 | |
| CL | 2014001277 | A1 | 10/2014 | |
| CN | 101462373 | B | 6/2009 | |
| CN | 101617852 | A * | 1/2010 | |
| CN | 102740715 | B | 10/2012 | |
| CN | 102986818 | A * | 3/2013 | |
| CN | 104487235 | B | 4/2015 | |
| CN | 109661176 | A | 4/2019 | |
| CN | 109788766 | A | 5/2019 | |
| CN | 208976319 | U | 6/2019 | |
| DE | 2408321 | A1 | 9/1975 | |
| DE | 59408066 | | 9/1975 | |
| DE | 59607081 | | 9/1975 | |
| DE | 59610024 | | 9/1975 | |
| DE | 19637640 | C2 | 3/1998 | |
| DE | 19756797 | A1 | 6/1999 | |
| DE | 19909608 | A1 | 1/2000 | |
| DE | 19834524 | A1 | 2/2000 | |
| DE | 19857138 | A1 | 7/2000 | |
| DE | 202004014365 | U1 | 11/2004 | |
| DE | 202004014365 | U1 * | 12/2004 | ............ A22C 17/04 |
| DE | 202005012430 | U1 | 11/2005 | |
| DE | 19981456 | B4 | 6/2006 | |
| DE | 202007004473 | U1 | 6/2007 | |
| DE | 102007063465 | A1 | 6/2009 | |
| DE | 202010001849 | U1 | 5/2010 | |
| DE | 112011100359 | A5 | 11/2012 | |
| DE | 102012106708 | A9 | 10/2014 | |
| DE | 102013014418 | A1 * | 3/2015 | ............ A22C 17/004 |
| DE | 102016108200 | B3 | 12/2016 | |
| DE | 102018101985 | B3 * | 9/2018 | ............ A22C 17/04 |
| DE | 102018102672 | B9 | 7/2019 | |
| DE | 102018112040 | A1 | 11/2019 | |
| DE | 102018112902 | A1 | 12/2019 | |
| DK | 0774208 | T3 | 4/2003 | |
| DK | 176472 | B1 | 4/2008 | |
| DK | 2129229 | T5 | 7/2013 | |
| DK | 178017 | B1 | 3/2015 | |
| DK | 178579 | B1 | 7/2016 | |
| EP | 43599 | A1 | 1/1982 | |
| EP | 0375877 | A2 * | 7/1990 | |
| EP | 0796561 | A1 * | 9/1997 | |
| EP | 0642738 | B1 | 4/1999 | |
| EP | 0966202 | A1 | 12/1999 | |
| EP | 0781645 | B1 | 6/2001 | |
| EP | 0774208 | B1 | 1/2003 | |
| EP | 2555980 | A1 | 2/2013 | |
| EP | 2129229 | B1 | 5/2013 | |
| EP | 2877341 | A1 | 6/2015 | |
| EP | 2591681 | B1 | 1/2017 | |
| EP | 3225559 | A1 | 10/2017 | |
| EP | 3275313 | A1 | 1/2018 | |
| EP | 3490383 | A1 | 6/2019 | |
| EP | 3524420 | A1 | 8/2019 | |
| EP | 3569397 | A1 | 11/2019 | |
| ES | 2131606 | T3 | 8/1999 | |
| ES | 2160201 | T3 | 11/2001 | |
| ES | 2189849 | T3 | 7/2003 | |
| GB | 201190 | A | 7/1923 | |
| GB | 751757 | A | 7/1956 | |
| GB | 1571238 | A | 7/1980 | |
| GB | 2093331 | A | 9/1982 | |
| GB | 2455643 | A * | 6/2009 | ............ A22C 17/004 |
| GB | 2455643 | B | 6/2009 | |
| IL | 119906 | A | 11/1999 | |
| IS | 2433 | B | 10/2008 | |
| JP | 5688094 | B2 | 10/1978 | |
| JP | 2000006092 | A | 1/2000 | |
| JP | 3090375 | B2 | 9/2000 | |
| JP | 2002028894 | A | 1/2002 | |
| JP | 2002036176 | A | 2/2002 | |
| JP | 2002059394 | A | 2/2002 | |
| JP | 2002515752 | A | 5/2002 | |
| JP | 2002337092 | A | 11/2002 | |
| JP | 4366214 | B2 | 11/2009 | |
| JP | 4685395 | B2 | 5/2011 | |
| JP | 5819101 | B2 | 11/2015 | |
| JP | 6100474 | B2 | 3/2017 | |
| JP | 2019526061 | A | 9/2019 | |
| JP | 2019527369 | A | 9/2019 | |
| KR | 2019039527 | A | 4/2019 | |

(56) References Cited

FOREIGN PATENT DOCUMENTS

| KR | 2019040199 | A | | 4/2019 | | |
|---|---|---|---|---|---|---|
| NL | 1008515 | C2 | | 9/1999 | | |
| NL | 1037871 | C2 | | 10/2011 | | |
| NO | 323027 | B1 | | 12/2006 | | |
| PL | 2591681 | T3 | | 6/2017 | | |
| RU | 2606101 | C2 | | 1/2017 | | |
| SE | 511326 | C2 | | 9/1999 | | |
| UA | 111902 | C2 | | 6/2016 | | |
| WO | 1999033349 | A1 | | 7/1999 | | |
| WO | 2000007452 | A1 | | 2/2000 | | |
| WO | 2000035292 | A1 | | 6/2000 | | |
| WO | WO-0035292 | A1 | * | 6/2000 | ............. | A22C 17/04 |
| WO | 2008116650 | A1 | | 10/2008 | | |
| WO | 2011092087 | A1 | | 8/2011 | | |
| WO | 2011136643 | A1 | | 11/2011 | | |
| WO | 2013072247 | A1 | | 5/2013 | | |
| WO | 2014016210 | A1 | | 1/2014 | | |
| WO | 2018019817 | A1 | | 2/2018 | | |
| WO | 2018022598 | A1 | | 2/2018 | | |
| WO | 2020127086 | A1 | | 6/2020 | | |

OTHER PUBLICATIONS

Normar Trading AS. YouTube Sepamatic 4000 Bone Separator for Meat and Fish dated Jan. 30, 2020 (entire video) URL: https://www.youtube.com/watch?v=GNJIUNT3dR8> (3 pages).

International Search Report issued in application No. PCT/US2020/059106 dated Mar. 9, 2021. (26 pages).

Extended European Search Report issued in counterpart European Application No. 20883934.0-1105/4017268 PCTUS2020059106 dated Jul. 13, 2023.

* cited by examiner

SEPARATING MACHINE

CROSS-REFERENCE TO RELATED APPLICATION

This application is a nonprovisional application of, and claims priority to U.S. Provisional Patent Application 62/933,325, filed Nov. 8, 2019 and incorporated herein by reference.

FIELD OF THE DISCLOSURE

This disclosure relates to food separating machines and separating methods.

BACKGROUND

A separating machine functions to separate a source material into portions with a first consistency and a second consistency (e.g., a hard consistency and a soft consistency). Such machines may be useful in the food industry for separating a desired portion (e.g., a food product) of a source food product from an undesired portion (e.g., a waste product). Examples of such food products include beef or other meat products to remove gristle and/or bone, and fish to separate or remove skin and/or fish bones.

SUMMARY OF THE DISCLOSURE

In one example, a separating machine is provided to separate a food source material into a first food portion and a second food portion. The separating machine includes a frame and a separating arrangement supported by the frame. The separating arrangement includes a roller assembly; a belt assembly including a belt extending about and configured to be driven by the roller assembly, the belt having an inner surface contacting the roller assembly and an outer surface opposite the inner surface; a drum assembly including a drum that defines a drum interior, an inner surface facing the drum interior, an outer surface opposite the inner surface, and a plurality of holes extending between the inner and outer surfaces of the drum. The drum assembly is arranged proximate to the belt assembly to define a separation area for the food source material in between. The separating arrangement further includes an inlet assembly configured to receive the food source material and to direct the food source material into the separation area. The belt assembly is arranged relative to the belt assembly such that the food source material delivered by the inlet assembly into the separation area is pressed by the belt against the outer surface of the drum and the first food portion is pressed through the holes into the drum interior while the second food portion remains outside of the drum interior, thereby separating the first and second food portions. The separating machine further includes a belt tensioning device coupled to the roller assembly and configured to reposition at least a portion of the roller assembly to adjust a tension of the belt.

In a further example, a method is provided for separating a food source material into a first food portion and a second food portion. The method includes receiving the food source material in an inlet assembly; directing the food source material from the inlet assembly into a separation area in between a belt of a belt assembly extending about a roller assembly and a drum assembly with a drum having a plurality of holes extending between inner and outer surfaces of the drum; pressing, with the belt, the food source material against the outer surface of the drum such that the first food portion passes through the plurality of holes and the second food portion remains outside of a drum interior, thereby separating the first and second food portions; and tensioning the belt with a tensioning device coupled to at least a portion of the roller assembly.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 3:
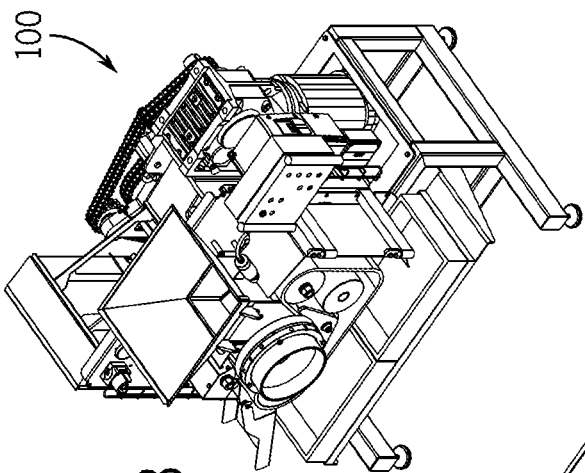
FIG. 3 is a top, front isometric view of the separating machine of FIG. 1 with a housing portion removed according to an example embodiment.

An example separating machine 100 is depicted in FIGS. 1-17 discussed in greater detail below. With initial reference to FIGS. 1 and 2, the separating machine 100 generally functions to separate a food source material into portions with a first food portion with a first consistency and a second food portion with a second consistency (e.g., a hard consistency and a soft consistency). As examples, from the food source material, the separating machine 100 may separate a food product with a relatively soft consistency, such as a meat, sausage, fish or cheese item, from a waste product with a relatively hard consistency, such as gristle, bone, fish bones, fish skin, or packaging materials that enclose the respective food products.

Additionally referring to the views of FIGS. 3-5, 7, and 8, the separating machine 100 includes a separating arrangement 130 generally arranged within a primary housing portion 120 of a machine housing 110. Broadly, the separating arrangement 130 may be considered to include an inlet assembly 140, a drum assembly 150, a roller assembly 170, and a belt assembly 230. As also discussed in greater detail below, the separating machine 100 may further include one or more of a tensioning device 280 and a knife assembly 300 that facilitate operation of the separating machine 100 by improving the ability to separate the portions of the food source material. In one example, the tensioning device 280 and the knife assembly 300 may be operated by fluid pressure, and as used herein, the terms "pneumatic" and "hydraulic" may be used interchangeably in which gas and/or liquid is used as a working fluid.

Figure 1:
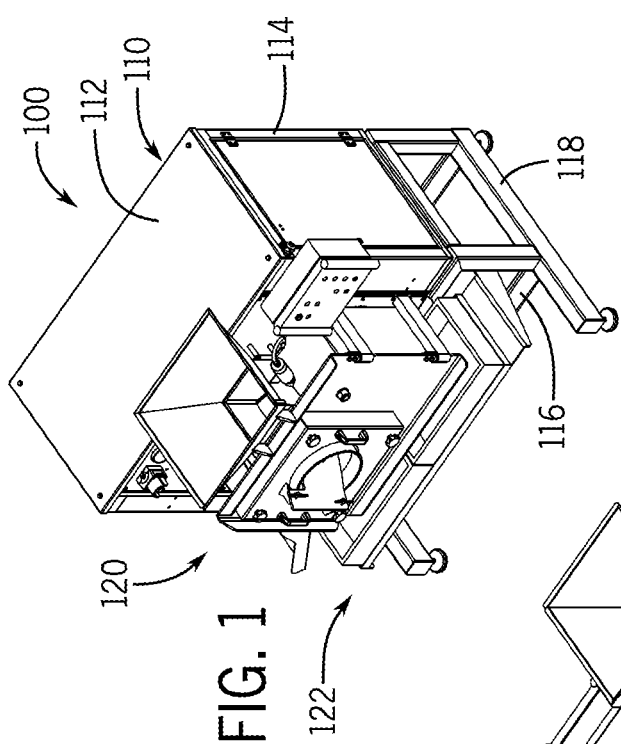
FIG. 1 is a top, front isometric view of a separating machine according to an example embodiment.
Figure 2:
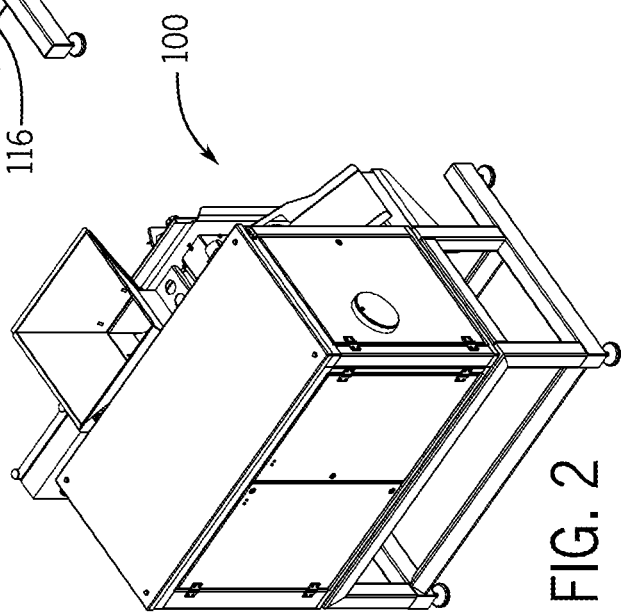
FIG. 2 is a top, rear isometric view of the separating machine of FIG. 1 according to an example embodiment.

In one example and best shown in FIGS. 1 and 2, the separating machine 100 includes the frame or housing 110 with one or more walls 112 supported by one or more vertical members 114, lateral members 116, and cross members 118. The frame 110 may be considered to include the primary portion or housing 120 that houses most of the components of the separating machine 100 and a shelf portion 122 arranged vertically underneath the primary housing 120. The views of FIGS. 1 and 2 particularly depict the frame walls 112 that enclose the interior components of the separating machine 100. The walls 112 may include one or more doors or access panels to allow access to the internal components of the separating machine 100.

Figure 4:
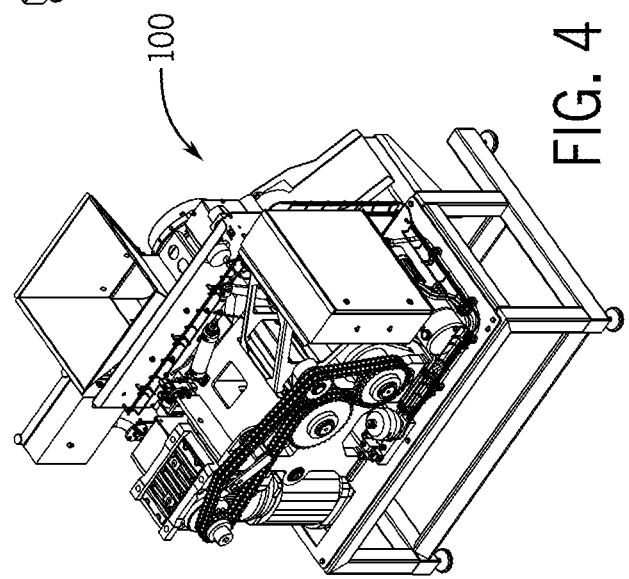
FIG. 4 is a top, rear isometric view of the separating machine of FIG. 1 with a housing portion removed according to an example embodiment.
Figure 5:
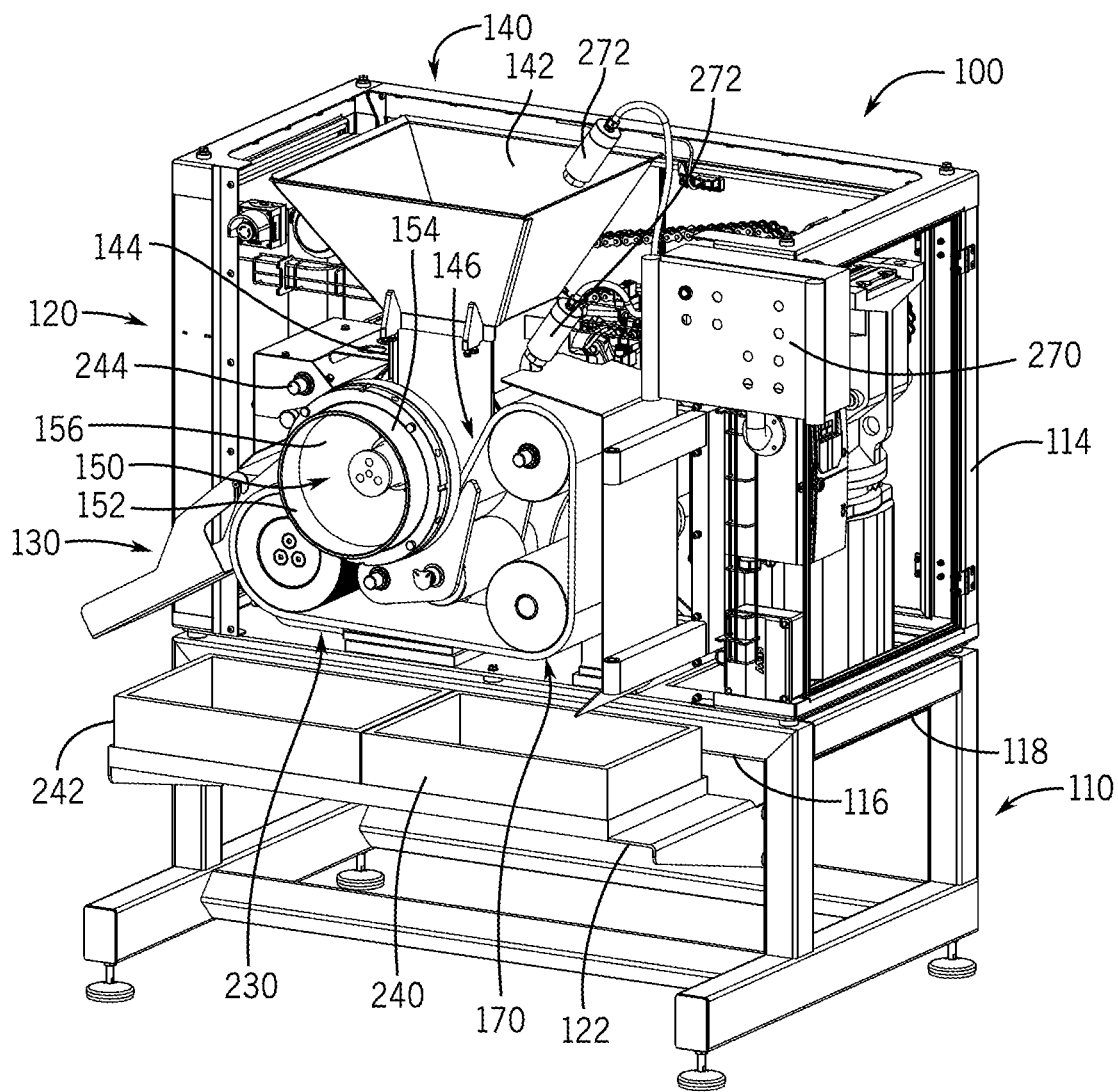
FIG. 5 is a further front isometric view of the separating machine of FIG. 1 with portions of the housing removed according to an example embodiment.
Figure 6:
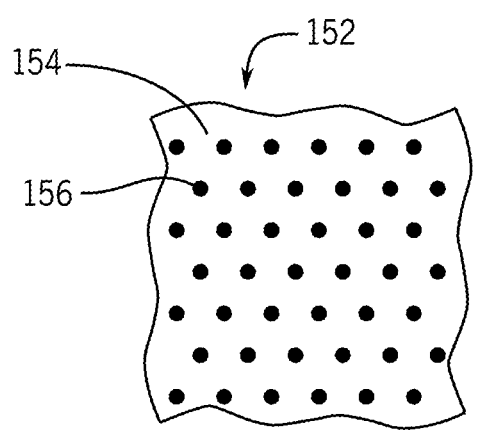
FIG. 6 is a closer partial view of an outer surface of a drum of the separating machine of FIG. 1 according to an example embodiment.

Reference is further made to FIG. 3-5, which depict front isometric views of the separating machine 100 with the walls 112 removed for clarity. In one example, the separating machine 100 includes a separating arrangement 130 generally arranged within the primary housing 120. As noted, the separating arrangement 130 may be considered to include an inlet assembly 140, a drum assembly 150, a roller assembly 170, and a belt assembly 230.

The inlet assembly 140 includes an inlet funnel 142 and an inlet passage 144 coupled to the inlet funnel 142. The inlet funnel 142 generally has internally tapered walls to receive the food source material in any suitable manner, including by an operator or a loading assembly. The inlet passage 144 receives the food source material from the inlet funnel 142 and guides the food source product into a separation area 146, as described in greater detail below.

In one example, the drum assembly 150 includes a drum 152 with an outer surface 154 and an inner surface 156. The inner surface 156 defines a drum interior. As described in greater detail below, the drum 152 includes one or more rows or arrangements of holes 158 extending around the circumference and through the drum 152, e.g., from the outer surface 154 to the inner surface 156. The holes 158 may be obscured in FIG. 3; and as such, brief reference is made to FIG. 6, which depicts a portion of the outer surface 154 of the drum 154 with an array of holes 158. The holes 158 within the drum 152, through which the food product portions of soft consistency are passed, may have a width in the range of 0.1-30 mm, including approximately 1-20 mm. The holes 158 may be round, have a curved shaped rim, and/or have a different shape.

The drum 152 may have a closed end 160 and an open end 162 with the closed end 160 oriented toward the interior of the separating machine 100 and the open end 162 oriented away from the interior of the separating machine 100. As best shown in the view of FIG. 1, the open end 162 of the drum 152 may extend beyond or proximate to an outer front wall 112 of the separating machine 100. The drum 152 may be supported for rotation by a generally horizontal shaft 164 about a generally horizonal axis. As described in greater detail below, the drum assembly 150 may include one or more drive elements for facilitating rotation. The drum assembly 150 may further include a drum cone 166 arranged within the drum interior for rotation with the drum 152. The drum cone 166 may have a relatively wide base at the closed end 160 of the drum 152 and a relatively narrow base at the open end 162 of the drum 152.

In this example, the roller assembly 170 may include a number of roller devices 180, 190, 200, 210, 220 that generally operate to support the belt assembly 230, as discussed in greater detail below.

Generally, each roller device 180, 190, 200, 210, 220 includes a roller 182, 192, 202, 212, 222 supported by a roller shaft 184, 194, 204, 214, 224 for rotation about a respective generally horizonal axis. Each roller 182, 192, 202, 212, 222 is positioned on a first end of the respective roller shaft 184, 194, 204, 214, 224, and a drive element may be positioned on the other end of one or more of the roller shafts 184, 194, 204, 214, 224, as discussed in greater detail below. As a result, the roller devices 180, 190, 200, 210, 220 are configured to be driven, or otherwise rotate, to drive or otherwise support the belt assembly 230. Additional details regarding operation of the roller assembly 170 are provided below.

The belt assembly 230 is generally formed by an endless belt 232 that is wrapped around the rollers 182, 192, 202, 212, 222 of the roller devices 180, 190, 200, 210, 220. During operation, one or more of the rollers 182, 192, 202, 212, 222 operate to drive or otherwise rotate with the belt 232. The endless belt 232 may be formed by a deformable material, such as an elastically deformable material, including a composite material that may have layers of differing strength, for example tensile and/or tearing strength. In one example, the surface or the layers near the surface of the belt 232 may be a plastic material, for example a polyurethane material or a natural or synthetic rubber. The underside or inner surface of the belt 232 may be a continuous surface, through which no product of soft consistency may penetrate during the separating process. The belt 232 may have an intermediate layer that affords tensile strength in the longitudinal direction thereof, such as the form of cables of metal or other tensile-strength materials, including plastic material, a textile material, a fabric layer, e.g., including a textile material, for example a metallic material or plastic or the like. Additional layers, such as a wear layer, may be provided.

Accordingly, the roller assembly 170 cooperates with the belt assembly 230 to drive the endless belt 232 and to transport the food source material through the separation area 146 to be separated into food product and waste product, as described in greater detail below. The arrangement of the belt 232 around the roller devices 180, 190, 200, 210, 220 may vary.

The roller assembly 170 and belt assembly 230 may be supported by, enclosed by, and/or cooperate with one or more support elements, including panels 234 and/or scrapers 236 surrounding portions of the belt assembly 230, and support structures 238 supporting one or more of the roller devices 180, 190, 200, 210, 220. One or more auxiliary rollers 244 may also be provided in a position proximate to the drum 152. In one example, the support structures 238 may be in the form of plates, flanges, bearings, and the like that support the positioning of the roller devices 180, 190, 200, 210, 220.

In the example depicted in FIGS. 3 and 5, the first roller device 180 is arranged on a right side of the drum 152 in a position such that the horizonal axis of the first roller device 180 is arranged vertically above the horizonal axis of the drum 152. The second roller device 190 is also arranged on the right side of the drum 152 in a position such that the horizonal axis of the second roller device 190 is arranged vertically below the horizonal axis of the drum 152. In this example, the horizontal axis of the first roller device 180 and the horizontal axis of the second roller device 190 are vertically aligned. As described in the greater detail below, the second roller device 190 may be considered to be associated with a tensioning device 280 for applying a tension force to the belt 232, discussed below.

Figure 8:
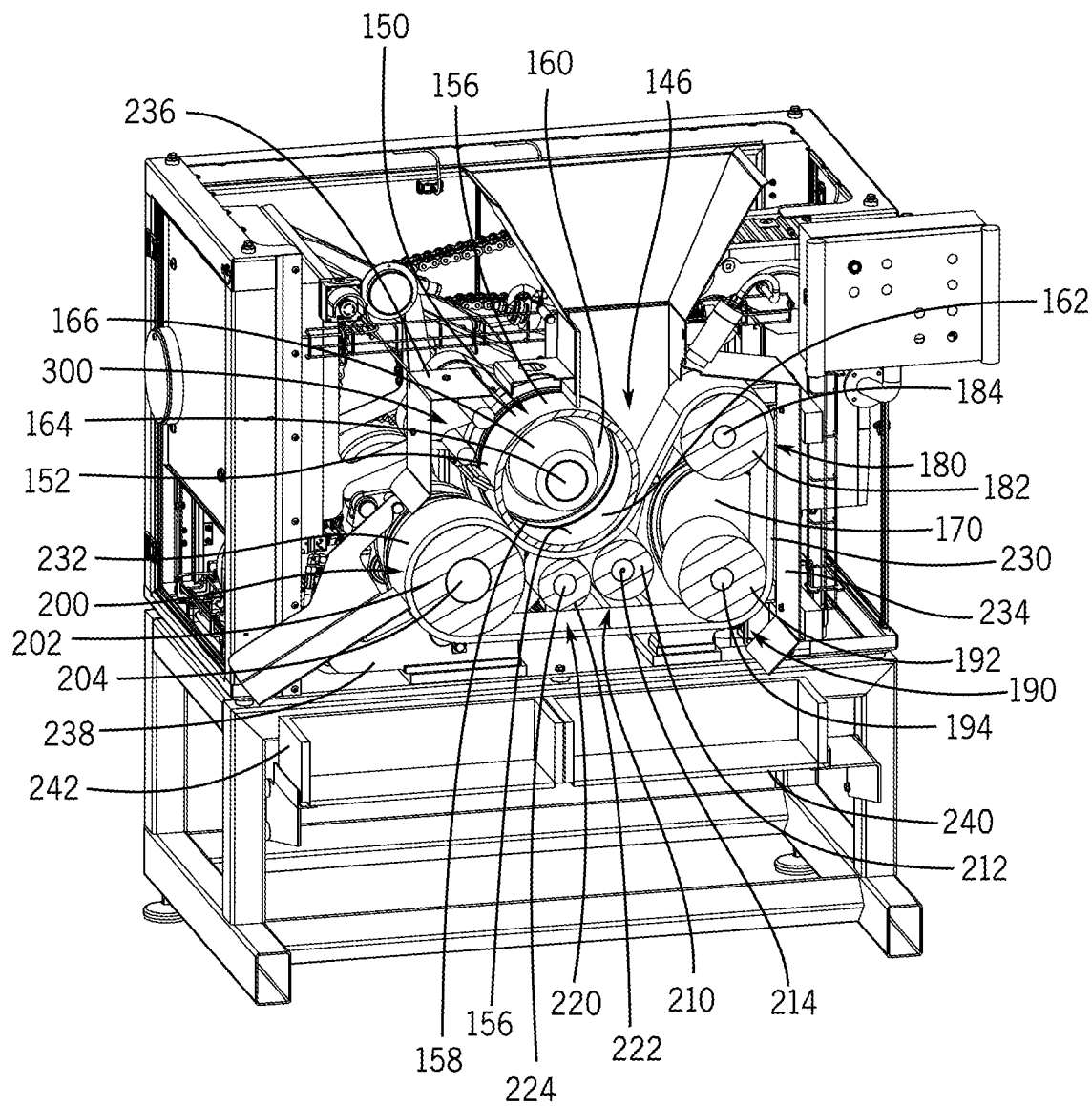
FIG. 8 is a sectional front isometric view of the separating machine of FIG. 1 according to an example embodiment.
Figure 9:
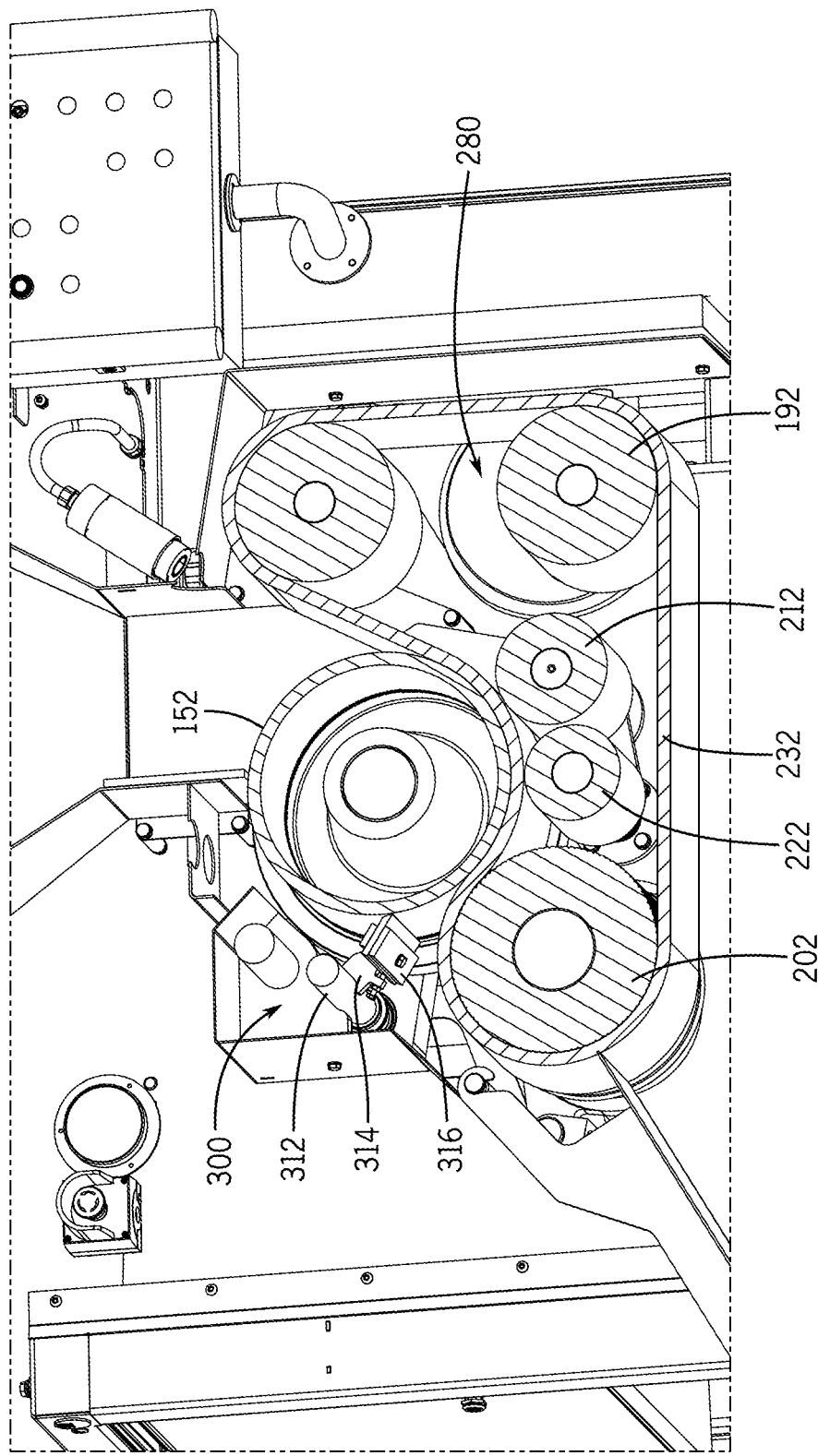
FIG. 9 is a closer sectional front isometric view of the separating machine of FIG. 1 according to an example embodiment.
Figure 10:
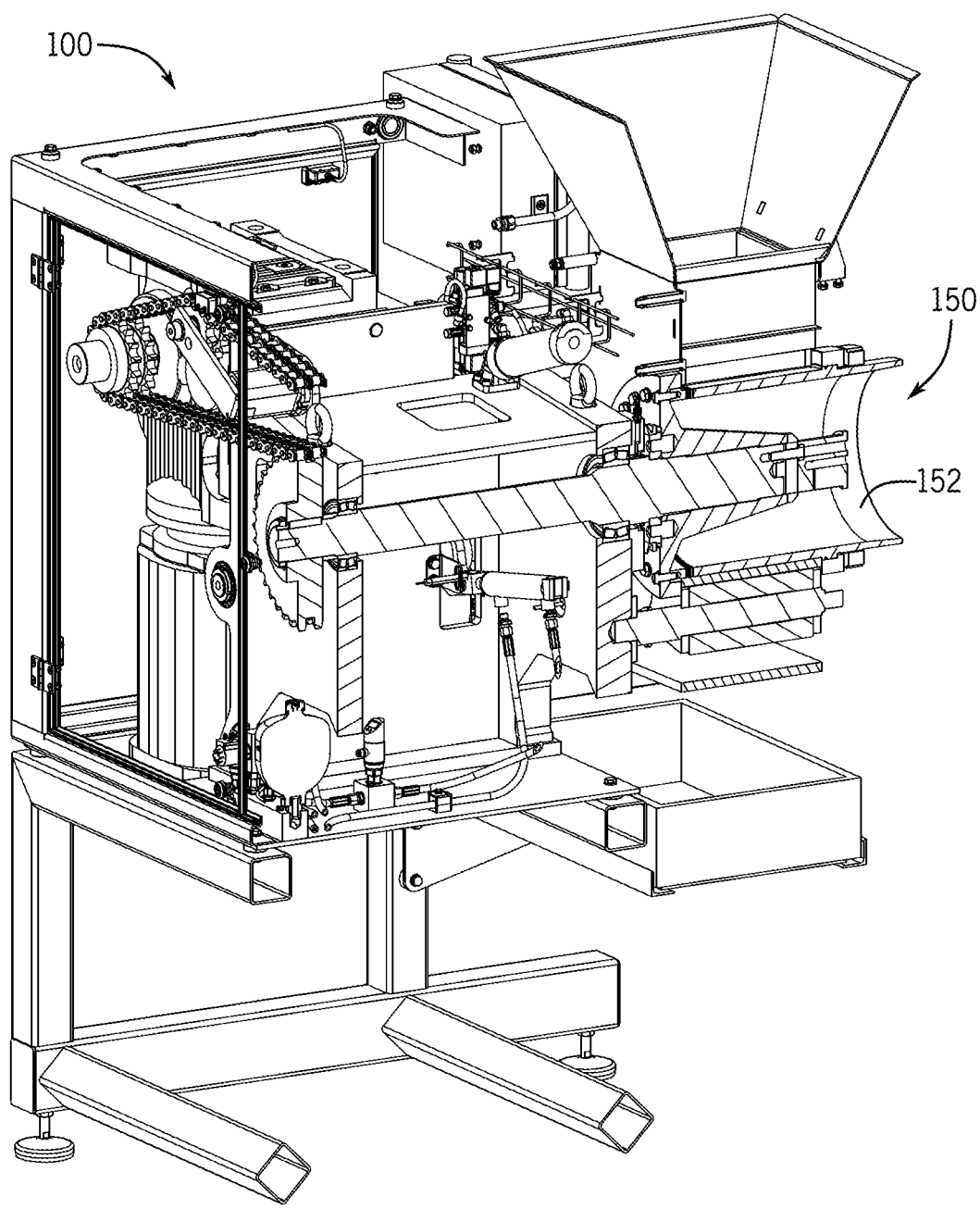
FIG. 10 is a sectional side isometric view of the separating machine of FIG. 1 according to an example embodiment.
Figure 11:
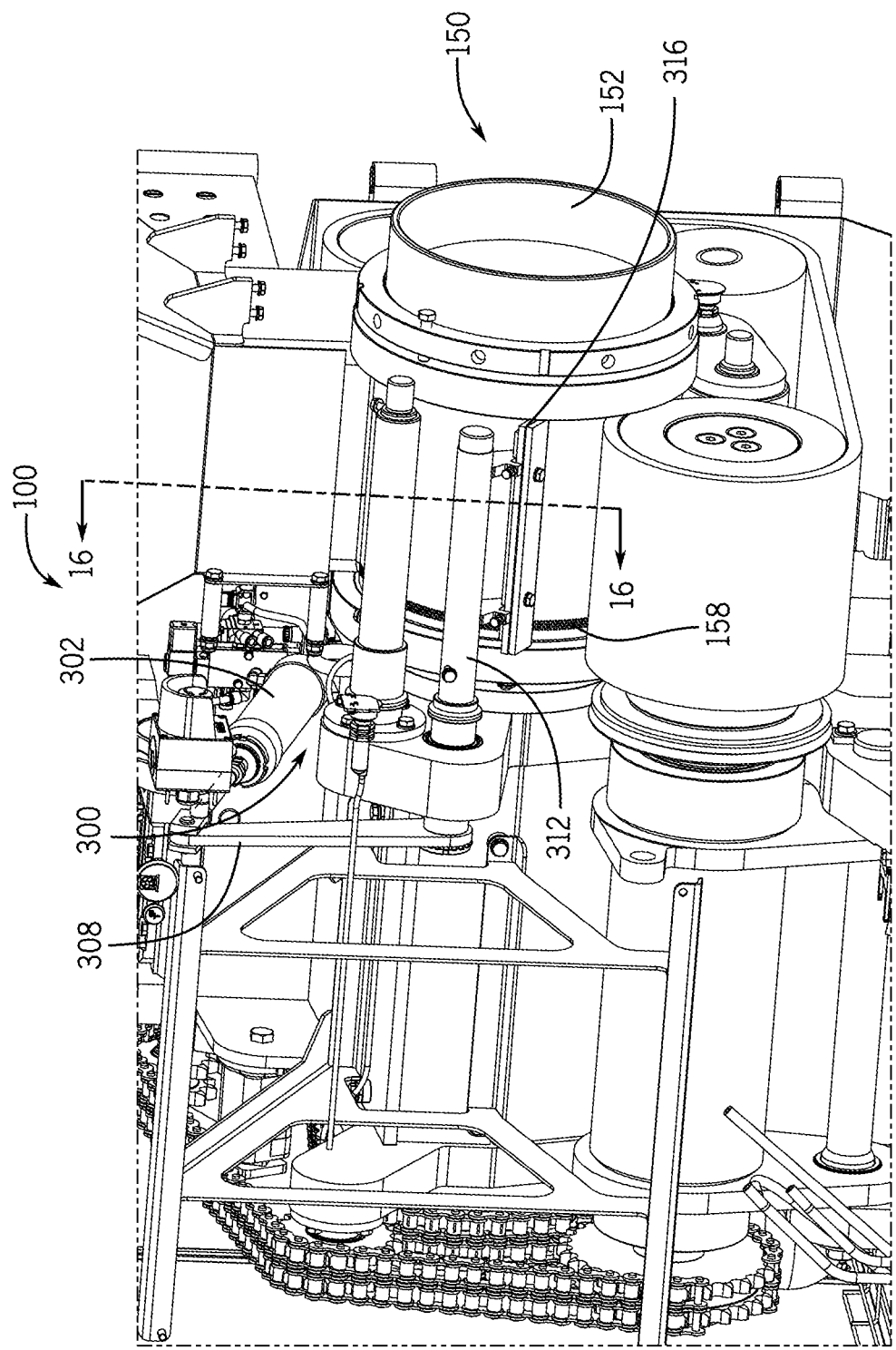
FIG. 11 is a side isometric view of a knife assembly relative to a drum assembly of the separating machine of FIG. 1 according to an example embodiment.

As best shown in FIGS. 5, 8, and 9, the third roller device 200 may be arranged on a left side (as viewed in FIGS. 5, 8, and 9) of the drum 152 in a position such that the horizonal axis of the first roller device 180 is arranged vertically below the horizonal axis of the drum 152. In this example, the horizontal axis of the third roller device 200 is vertically in between the horizontal axis of the first roller device 180 and the horizontal axis of the second roller device 190. As described in greater detail below, in one example, the third roller device 200 may be used to drive the belt 232.

The fourth and fifth roller devices 210, 220 may be arranged just underneath the drum 152. The fifth roller device 220 is positioned approximately directly vertically underneath the drum 152, and the fourth roller device 210 is positioned to the right (as viewed in FIGS. 5, 8, and 9) of the drum 152 and slightly above the fifth roller device 220. As described in greater detail below, the fourth and fifth roller devices 210, 220 cooperate to support the separation area 146 between the belt 232 and the drum 152, e.g., as a pressing apparatus to press the food source material on the belt 232 against the drum 152.

As a result of the arrangement of the roller assembly 170 and the belt assembly 230, the belt 232 is driven about the roller devices 180, 190, 200, 210, 220 to push the food source material against the drum 152, the food material into and through the drum 152, and to remove the waste product. As shown, the belt 232 extends around the first roller 182 along a path of more than 90°, in particular slightly less than 180°. The belt 232 extends around the second roller 192 along a path of approximately 90°; and the belt 232 extends around the third roller 202 along a path of greater than 180°. Further, the belt 232 extends across the tops of the fourth and fifth rollers 212, 222 such that, in effect, the fourth and fifth rollers 212, 222 function as a pressing apparatus for the separation area 146, as discussed in greater detail below.

As best shown in FIGS. 5 and 8, one or more bins 240, 242 may be arranged within the shelf portion 122 of the frame 110. In one example, the bins 240, 242 may include a food product bin 240 positioned to collect food product and a waste product bin 242 positioned to collect waste product.

Accordingly, operation of the separating machine 100 will now be described. As noted above, food source material is deposited into the inlet assembly 140, particularly into the inlet funnel 142; and the food source material falls vertically through the inlet funnel 142 and the inlet passage 144 into the separation area 146 formed in between the belt 232 and the drum 152. The belt 232 is driven by the roller assembly 170 in a first direction (e.g., the counter-clockwise direction in the view of FIG. 5) to transport the food source material initially deposited from the inlet assembly 140 in the separation area 146 toward the drum 152. The separation area 146 is arranged in the gap between the belt 232 and drum 152. In one example, the drum 152 is driven in a second direction (e.g., the clockwise direction in the view of FIG. 5). As a result, the belt 232 and the drum 152 are being driven in the effectively same lateral direction within the separation area 146. The configuration may be modified such that the belt 232 and/or the drum 152 may be driven in the other direction.

As the food source material is transported through the separation area 146, the food product with a softer consistency is pressed against the outer surface 154 of the drum 152 and deforms or is otherwise small enough in size to pass through the holes 158 (FIG. 6) within the drum 152, while the waste product with the harder consistency does not pass through the holes 158. In the direction of rotation of the belt 232, the height of the gap between the belt 232 and the drum 152 within the separation area 146 decreases in the downstream direction, thereby providing additional force for the food source material against the drum 152. The belt 232, as supported by the rollers 212, 222, function as a pressing arrangement for pressing the food source material against the drum 152 and the food product through the drum 152. As a result, the food product is separated from the waste product within the separation area 146.

As the food product is pressed through the holes 158 (FIG. 6), the food product enters the interior of the drum 152. The food product may be rotated within the drum 152 until falling or being pressed out of the open end 162 of the drum 152. The food product is transferred out of the drum 152 and falls into the food product bin 240. The drum cone 166 may facilitate and/or urge the food product out of the open end 162 of the drum 152. In some examples, a scraper element (not shown) may also be provided to scrap and urge the food product out of the drum 152.

After passing through the separation area 146, a portion of the waste product continues to be transported on the belt 232. As the belt 232 and associated waste product passes over the top of the roller 222, the waste product falls off the belt 232 (e.g. via gravity) and into the waste product bin 242. Additionally, any portion of the waste product that remains on the drum 152 may be removed with the knife assembly 300 such that these portions of waste product may fall back onto the belt 232 to subsequently be deposited into the waste product bin 242.

Figure 7:
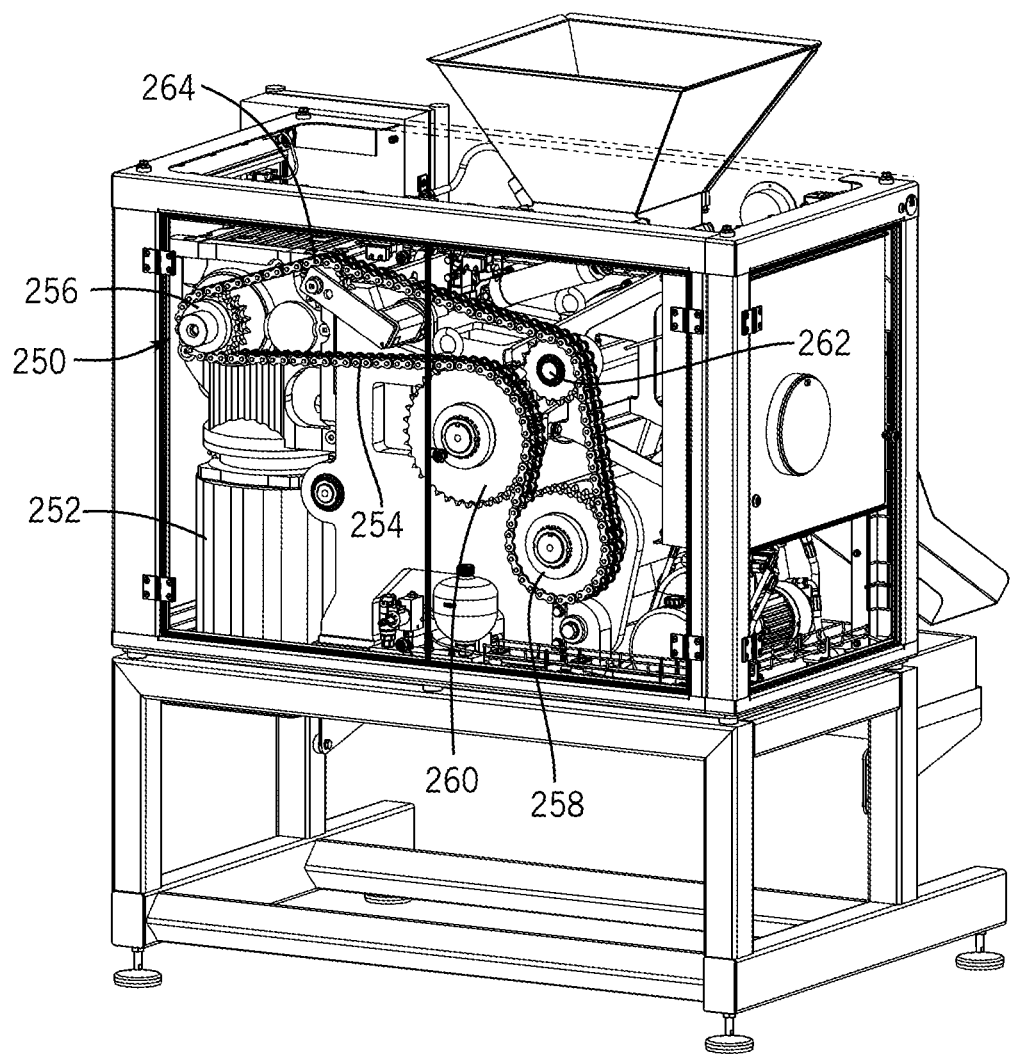
FIG. 7 is a further rear isometric view of the separating machine of FIG. 1 with portions of the housing removed according to an example embodiment.

Reference is now made to FIGS. 4 and 7, which depict rear isometric view of the separating machine 100 of FIG. 1 with portions of the frame 110 removed according to an example embodiment. The view of FIG. 7 particularly depicts portions of the drive arrangement 250. In one example, the drive arrangement 250 includes a motor 252, a chain drive 254, and one or more drive or guide elements 256, 258, 260, 262, 264. In one example, the drive or guide elements 256, 258, 260, 262, 264 may be in the form of sprockets.

During operation, the motor 252 generates a rotational force to drive the motor drive element 256 as the output of the motor 252. The motor 252 may be any suitable type of motor, including a combustion, electric, hydraulic, and/or pneumatic motor.

The chain 254 is an endless chain that engages with the motor drive element 256 and one or more roller drive elements 258 of one or more of the roller devices 180, 190, 200, 210, 220. In this example, the roller drive element 258 is affixed to the roller shaft 204 of the third roller device 200. As a result, as the motor drive element 256 drives the chain 254, the chain 254 engages with and drives the roller drive element 258 of the third roller device 200, thereby driving the roller 202 of the third roller device 200. As noted above, the third roller 202 engages to rotate and drive the belt 232. In this example, the chain 254 also engages the drum drive element 260 positioned on the periphery of the drum 152. As such, the chain 254 additionally drives the drum 152. The chain 254 also engages guide elements 262, 264. Additional or alternative drive elements or arrangements may be provided.

In one example, the separating machine 100 further includes a controller 270 (see, e.g., FIG. 5) to control various aspects of operation. The controller 270 may receive input from an operator interface and/or from one or more sensors 272 associated with the separating machine 100. In response, the controller 270 may activate and/or deactivate the motor 252; and in some examples, the controller 270 may control the speed of the motor 252, and thus, the speed of the belt assembly 230 and the drum assembly 150. The controller 270 may further generate commands for the tensioning device 280 and knife assembly 300. Other operating parameters may also be modified and/or controlled by the controller 270.

As introduced above, a tensioning device 280 may be associated with the second roller device 190 for applying a tension force to the belt 232. In one example, the second roller device 190 is mounted on the tensioning device 280 such that the tensioning device 280 is configured to selectively reposition the second roller device 190. Reference is additionally made to FIGS. 9 and 12-14. In particular, as the belt 232 is be passed around the roller 192, the roller 192 may have a variable position in order to set the tensioning force on the belt 232 as set by the tensioning device 280. The tensioning of the belt 232 by the tensioning device 280 operates to apply a tension to the belt 232 to thus urge the food source material on the belt 232 in the separation area 146 to be pressed against the drum 152. The tensioning device 280 may be a fluid pressure tensioning device, although other mechanisms may be provided to maintain the tension on the belt 232.

Figure 12:
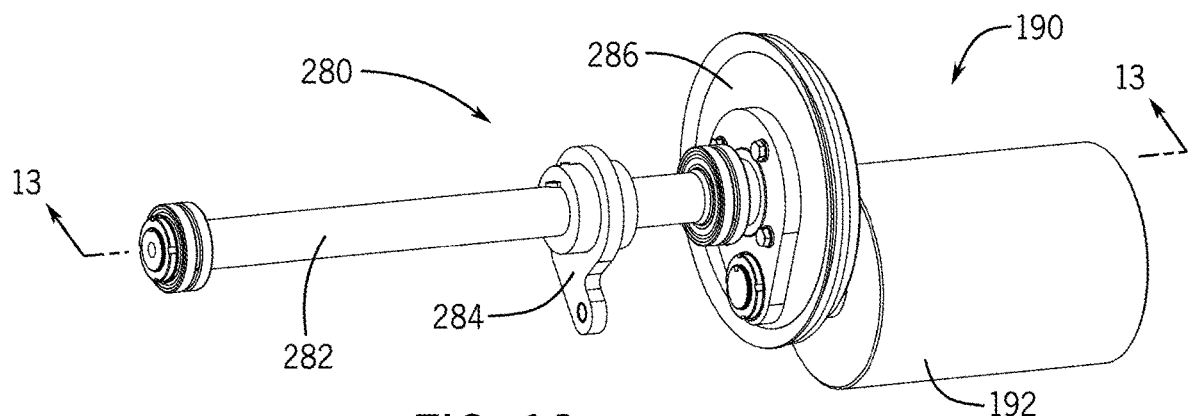
FIG. 12 is an isolated isometric view of the tensioning device that may be implemented in the separating machine of FIG. 1 according to an example embodiment.
Figure 13:
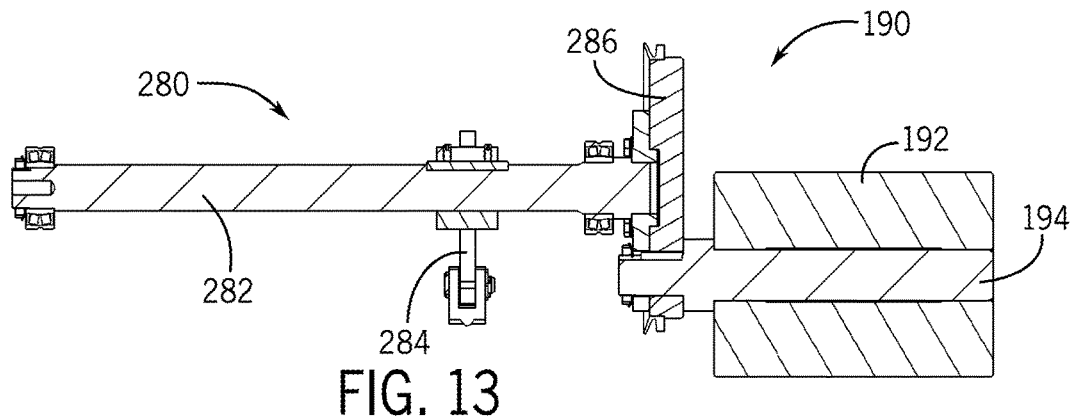
FIG. 13 is a cross-sectional view of the tensioning device through line 13-13 of FIG. 12 that may be implemented in the separating machine of FIG. 1 according to an example embodiment.
Figure 14:
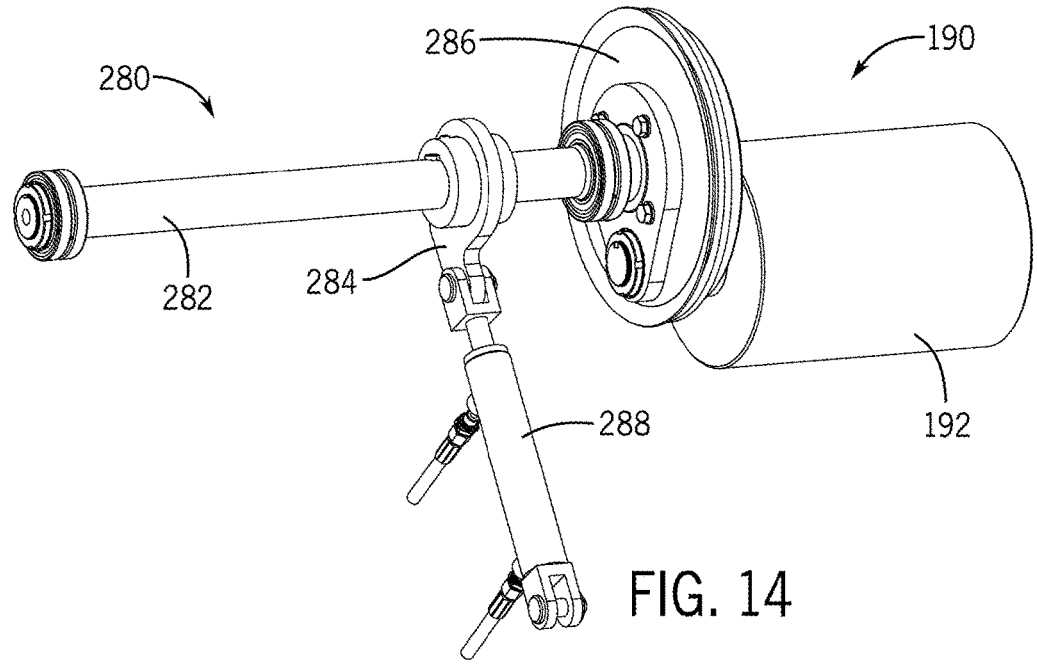
FIG. 14 is a further isolated isometric view of the tensioning device with an actuator that may be implemented in the separating machine of FIG. 1 according to an example embodiment.

The tensioning device 280 from FIG. 9 is depicted in greater detail in FIGS. 12-14. As shown, the tensioning device 280 includes a tensioner shaft 282; a tensioner sub-shaft flange 284; and a tensioning wheel 286. The roller device 190, particularly roller 192, is mounted on one side of the tensioning wheel 286 in a position offset from center such that rotation of the tensioning wheel 286 about a central longitudinal axis spatially repositions the central longitudinal axis of the roller 192. In other words, the tensioning wheel 286 eccentrically joins the tensioner shaft 282 and the roller shaft 194 on which the roller 192 is mounted.

As best shown in FIG. 14, an actuator 288 in the form of a hydraulic or pneumatic cylinder coupled to the machine frame 110 (not shown in FIG. 14) and including an arm that is coupled to the tensioner sub-shaft flange 284. One or more hydraulic or pneumatic fittings are arranged along the cylinder of the actuator 288 such that pressure on each side of the rod end functions to extend and retract the rod, thereby pushing and pulling the tensioner sub-shaft flange 284, which in turn pivots the tensioner shaft 282, tensioner wheel 286, and roller device 190.

The tensioning device 280 operates to maintain a constant tension on the separator belt 232, even when the belt 232 may increase in length over time due to wear and use. As a result, the tensioning device 280 functions to prevent slack in the belt 232 and maintains a constant position of the belt 232 in all conditions, thereby increasing the life of the belt 232.

As such, during operation, the tensioning device 280 may operate as a hinge system in which the roller 192) may move forward and backward (e.g., toward and away) relative to the belt 232. The fluid power unit 290 may have a pre-set pressure of the fluid (e.g., oil). Upon activation by an operator, in one example, the tensioning of the belt 232 is automatic. In particular, the rod of the tensioning actuator 288 is extended until a sensor in the system is energized. The sensor is set to at a pre-set pressure, which corresponds to a selected tension of the belt 232. The cylinder of the tensioning device 280 remains under pressure in a manner similar to a preload to automatically compensate for any subsequent increase in belt length.

Figure 15C:
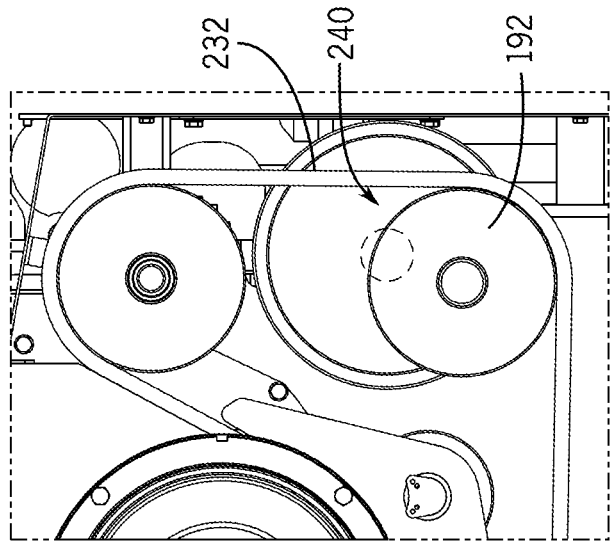
FIGS. 15A-15C are side views of portions of a roller assembly of the separating machine of FIG. 1 depicting operation of the tensioning device according to an example embodiment.
Figure 15B:
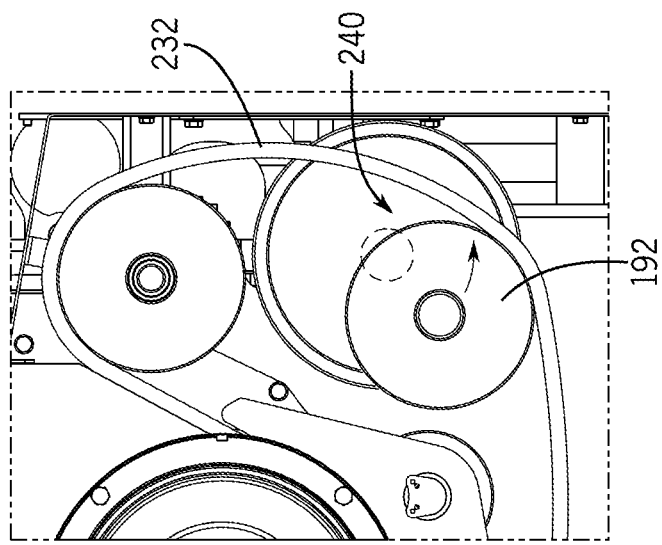
Figure 15A:
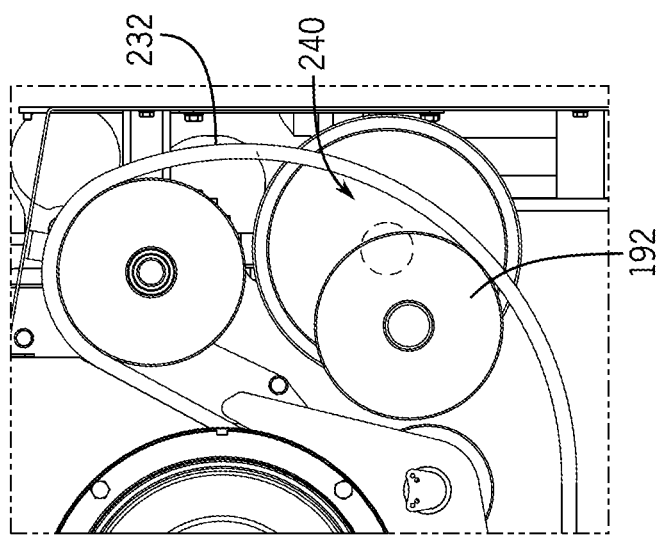

One example of the tensioning operation is depicted in the sequence of views in FIGS. 15A, 15B, and 15C. In particular, in the view of FIG. 15A, the roller 192 is depicted in a first position that results in relative slack in the belt 232. In the view of FIG. 15B, the roller 192 has pivoted toward the belt 232 (e.g., as a result of fluid pressure from the power unit 290) operating to reposition the tensioning actuator 288 into a second potion such that the roller 192 functions to take up some of the slack in the belt 232. In the view of FIG. 15C, the roller 192 has pivoted toward the belt 232 into a third potion with a desired amount of slack in the belt 232. As noted above, a sensor may set the pressure within the power unit 290 at the corresponding pressure to the third position to provide the desired amount of slack in the belt 232.

Figure 16:
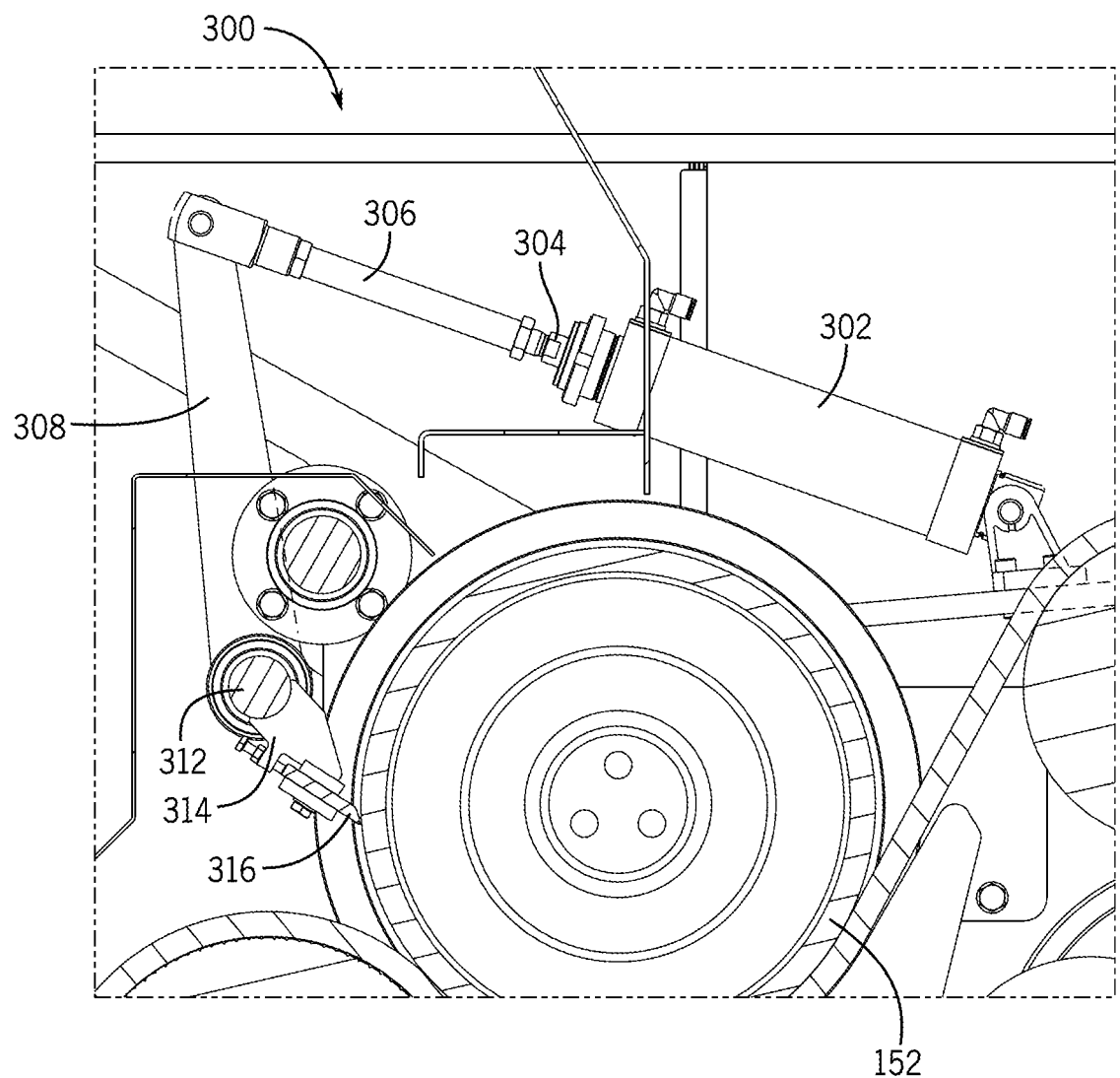
FIG. 16 is a sectional view depicting a knife assembly of the separating machine through line 16-16 of FIG. 11 according to an example embodiment.

The operation and structure of the knife assembly 300 is more clearly depicted by the cross-sectional view of FIG. 16. As shown, the knife assembly 300 is generally positioned at an angular position along the outer surface of the drum 152 that is upstream of the angular position of the separation area along the shortest path between positions in a driven rotational direction of the drum 152. In one example, the knife assembly 300 is formed by a knife assembly actuator 302 mounted to a stationary element, such as the frame 110. The knife assembly actuator 302 includes a cylinder and a rod element within the cylinder that is fixed at a rod coupling 304 to an actuator rod 306. As shown, the knife assembly actuator 302 includes fluid fittings along the cylinder such that fluid pressure operates to extend and retract the rod element and attached actuator rod 306.

The actuator rod 306 is coupled to a knife assembly arm 308, which in turn is coupled to a knife coupling 310 supporting a knife shaft 312. A knife bracket 314 securing a knife element 316 is mounted on the knife shaft 312. Upon extension or retraction of the actuator rod 306 by the actuator 302, the knife assembly arm 308 is pivoted about the opposite end, thereby pivoting the knife shaft 312. In turn, the knife bracket 314 repositions the knife element 316 towards and away from the outer surface of the drum 152. In this example, as the actuator rod 306 is extended, the knife element 316 presses closer to the drum 152, and as the actuator rod 306 is retracted, the knife element 316 moves away from the drum 152.

As introduced above, the knife assembly 300 may be driven by the power unit 290 based on commands from the controller 270, either automatically or based on input from the operator. During operation, the knife element 316 may be pressed against the drum 152 to scrape food material off the outer surface (and/or to press the first food portion through the holes in the drum 152). The controller 270 may modify the amount of pressure of the knife element 316 against the drum based on manual input or automatically based on sensor inputs.

Figure 17:
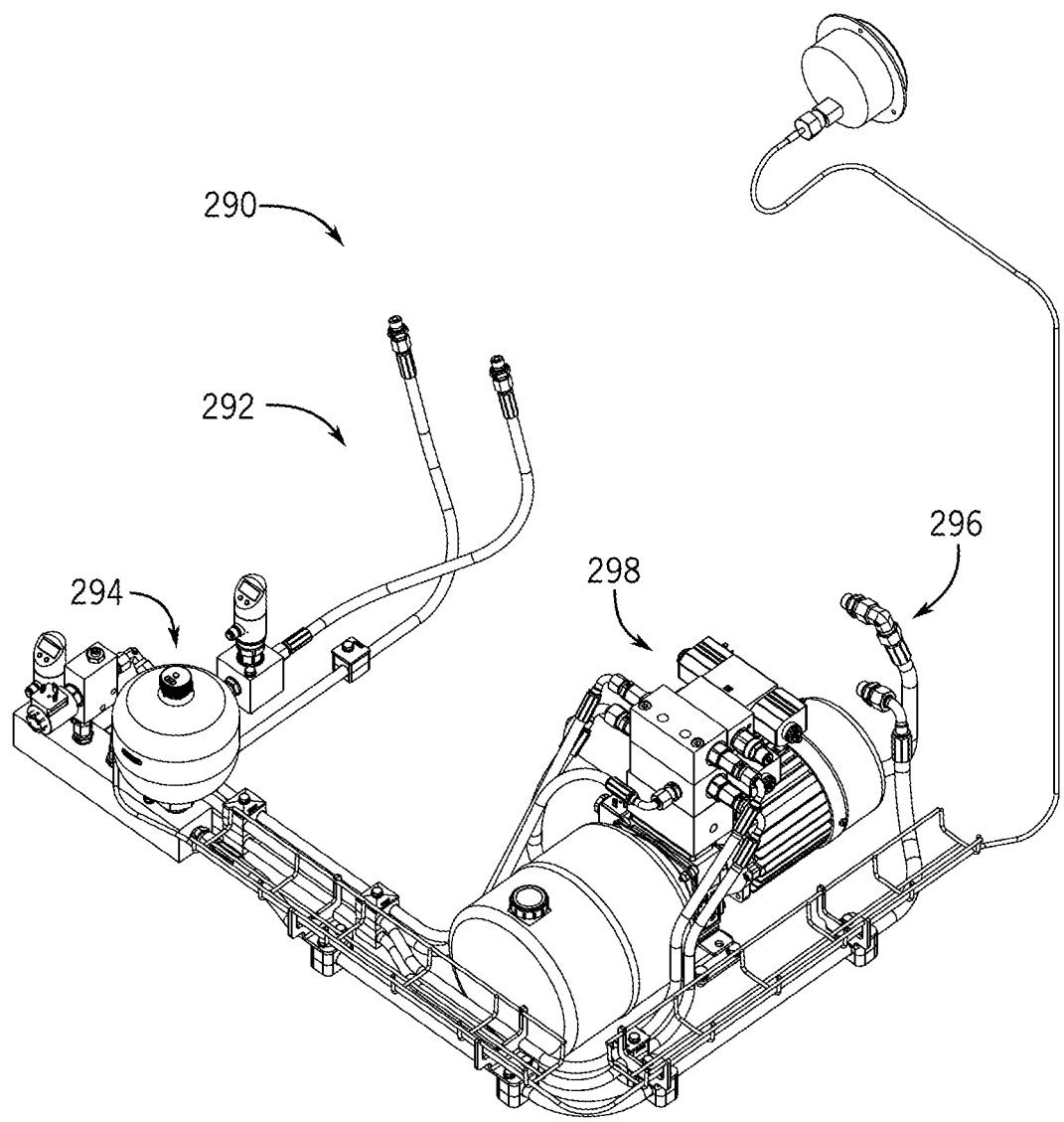
FIG. 17 is an isometric view of a power unit that may be incorporated into the separating machine of FIG. 1 according to an example embodiment.

Referring additionally to FIG. 17, the tensioning device 280 and knife assembly 300 discussed below may be driven and otherwise controlled by a fluid power unit 290. The fluid power unit 290 may include one or more couplings 292, 296 that extend between distribution elements 294, 298 for each of the tensioning device 280 and knife assembly 300, respectively. In one example, the couplings 292 of fluid power unit 290 provides (and releases) fluid pressure to the cylinder of the tensioning device 280, as described above, to reposition the roller 192 and modify the tension in belt 232; and the couplings 296 of fluid power unit 290 provides (and releases) fluid pressure to the cylinder of the knife assembly 300 to reposition the knife assembly 300 relative to the drum 152, as described below. Generally, the distribution elements 294, 298 may include manifolds, valves, sensors, and the like to facilitate control and efficient operation of each of the tensioning device 280 and knife assembly 300. Although depicted as a common fluid power unit 290 for each of the tensioning device 280 and knife assembly 300, in other examples, the tensioning device 280 and knife assembly 300 may be manipulated by separate power units 290. Moreover, the tensioning device 280 and knife assembly 300 may be operated by the same or different types of fluid.

Embodiments discussed herein may provide separating machines that may be operated with improved separation, higher power, and/or at higher operating speed. Further, embodiments, may provide a separating machine with a longer service life for the machine and the pressing elements, and permits more uniform implementation of the separating process. One embodiment further includes a method of separating products of hard and soft consistencies by operating the separating machine as discussed above. It should be understood that the separating machine described above may be used with other machines and/or may have a variety of configurations relative to each with all possibilities intended to be within the spirit and scope of the present disclosure.

As indicated above, one or more controllers may communicate with the various components of the separating machine (as well as machines, devices, and systems outside of the separating machine) to retrieve and/or send information or data as necessary. The controller may include any necessary hardware, software or any combination thereof to achieve the processes, methods, functionalities, operations, etc., of the present disclosure. In one example, the controller may include one or more of software and/or hardware in any proportion. In such an example, the controller may reside on a computer-based platform such as, for example, a server or set of servers. Any such server or servers may be a physical server(s) or a virtual machine(s) executing on another hardware platform or platforms. The nature of the configuration of such server or servers is not critical to the present disclosure. Any server, or for that matter any computer-based system, systems or elements described herein, will be generally characterized by one or more processors and associated processing elements and storage devices communicatively interconnected to one another by one or more busses or other communication mechanism for communicating information or data. In one example, storage within such devices may include a main memory such as, for example, a random access memory (RAM) or other dynamic storage devices, for storing information and instructions to be executed by the processor(s) and for storing temporary variables or other intermediate information during the use of the controller described herein. In one example, the controller may also include a static storage device such as, for example, read only memory (ROM), for storing static information and instructions for the processor(s). In one example, the controller may include a storage device such as, for example, a hard disk or solid state memory, for storing information and instructions. Such storing information and instructions may include, but not be limited to, instructions to compute, which may include, but not be limited to processing and analyzing information of all types. RAMs, ROMs, hard disks, solid state memories, and the like, are all examples of tangible computer readable media, which may be used to store instructions which comprise processes, methods and functionalities of the present disclosure. Execution of such instructions by the control member may cause the various computer-based elements of the control member to perform the processes, methods, functionalities, operations, etc., described herein. In some examples, the controller of the present disclosure may include hard-wired circuitry to be used in place of or in combination with, in any proportion, such computer-readable instructions to implement the disclosure.

The separating machine of the present disclosure may be operated in a wide variety of manners and all of such possibilities are intended to be within the spirit and scope of the present disclosure.

It should be understood that the use of any orientation or directional terms herein such as, for example, "top", "bottom", "front", "rear", "back", "left", "right", "side", etc., is not intended to imply only a single orientation of the item with which it is associated or to limit the present disclosure in any manner. The use of such orientation or directional terms is intended to assist with the understanding of principles disclosed herein and to correspond to the exemplary orientation illustrated in the drawings. The use of these terms in association with the separating machine and its components are not intended to limit the separating machine or its components to a single orientation or to limit the separating machine and its components in any manner.

While various embodiments of the disclosure have been described, it will be apparent to those of ordinary skill in the art that other embodiments and implementations are possible within the scope of the disclosure. Accordingly, the disclosure is not to be restricted except in light of the attached claims and their equivalents.

What is claimed is:

1. A separating machine configured to separate a food source material into a first food portion and a second food portion, the separating machine comprising:
    a frame;
    a separating arrangement supported by the frame and including
        a roller assembly;
        a belt assembly including a belt extending about and configured to be driven by the roller assembly, the belt having an inner surface contacting the roller assembly and an outer surface opposite the inner surface, wherein the roller assembly includes a plurality of rollers about which the belt extends;
        a drum assembly including a drum that defines a drum interior, an inner surface facing the drum interior, an outer surface opposite the inner surface, and a plurality of holes extending between the inner and outer surfaces of the drum, wherein the drum assembly is arranged proximate to the belt assembly to define a separation area for the food source material in between; and an inlet assembly configured to receive the food source material and to direct the food source material into the separation area, wherein the belt assembly is arranged relative to the belt assembly such that the food source material delivered by the inlet assembly into the separation area is pressed by the belt against the outer surface of the drum and the first food portion is pressed through the holes into the drum interior while the second food portion remains outside of the drum interior, thereby separating the first and second food portions; and a belt tensioning device coupled to the roller assembly and configured to reposition at least a portion of the roller assembly to adjust a tension of the belt, wherein the belt tensioning device includes a tensioning wheel eccentrically coupled to the at least one roller, a tensioner shaft extending from the tensioning wheel, and a tensioner actuator coupled to pivot the tensioner shaft such that the tensioning wheel is turned and the at least one roller is repositioned.

2. The separating machine of claim 1, wherein the belt tensioning device is coupled to at least one of the rollers and configured to reposition the at least one of the rollers to increase or decrease the tension of the belt.

3. The separating machine of claim 1, wherein the tensioning device is configured to be actuated by a fluid pressure.

4. The separating machine of claim 1, wherein the tensioning device is configured to maintain the tension in the belt over time.

5. The separating machine of claim 1, wherein the drum has an open end to direct the first food portion out of the separating arrangement.

6. The separating machine of claim 5, further comprising a first tray for receiving the first food portion from the drum interior and a second tray for receiving the second food portion from outside the drum.

7. The separating machine of claim 1, further comprising a knife assembly proximate to the outer surface of the drum to remove at least part of the second food portion from the outer surface of the drum.

8. The separating machine of claim 7, wherein the separation area is arranged at a first angular position along the outer surface of the drum and the knife assembly is arranged at a second angular position along the outer surface of the drum, and wherein the second angular position is upstream of the first angular position along a driven rotational direction of the drum.

9. The separating machine of claim 7, wherein knife assembly is configured to be actuated by a fluid pressure.

10. The separating machine of claim 7, wherein knife assembly includes a knife actuator, an actuator rod configured to be extended and retracted by the knife actuator, a knife assembly arm with a first end coupled to the actuator rod such that extension and retraction of the actuator rod pivots the knife assembly arm about a second end, a knife shaft coupled to the second end of the actuator rod to pivot with the second end of the actuator rod, a knife bracket mounted on the knife shaft, and a knife element mounted in the knife bracket such that extension and retraction of the actuator rod repositions the knife element.

11. The separating machine of claim 10, wherein the knife assembly is configured such that extension of the actuator rod presses the knife element closer to the outer surface of the drum and retraction of the actuator rod presses the knife element away from the outer surface.

12. The separating machine of claim 7, further comprising a power unit configured to supply fluid pressure to at least one of the tensioner device and the knife assembly.

13. The separating machine of claim 12, wherein the power unit is configured to supply fluid pressure to each of the tensioner device and the knife assembly.

14. A method for separating a food source material into a first food portion and a second food portion, the method comprising:

receiving the food source material in an inlet assembly;

directing the food source material from the inlet assembly into a separation area in between a belt of a belt assembly extending about a roller assembly and a drum assembly with a drum having a plurality of holes extending between inner and outer surfaces of the drum;

pressing, with the belt, the food source material against the outer surface of the drum such that the first food portion passes through the plurality of holes and the second food portion remains outside of a drum interior, thereby separating the first and second food portions; and tensioning the belt with a tensioning device coupled to at least a portion of the roller assembly, wherein the tensioning of the belt by the tensioning device includes pivoting, via a tensioner actuator, a tensioning wheel of the tensioning device that is eccentrically coupled to at least one roller of the roller device via a tensioner shaft extending from the tensioning wheel such that the at least one roller is repositioned.

15. The method of claim 14, wherein the tensioning of the belt by the tensioning device is actuated with fluid pressure.

16. The method of claim 14, further comprising maintaining a predetermined tension within the belt over time.

17. The method of claim 14, further comprising scraping the outer surface of the drum with a knife assembly to remove at least part of the second food portion from the outer surface of the drum.

18. The method of claim 17, further comprising adjusting a position of the knife assembly relative to the drum with a fluid pressure.

19. The separating machine of claim 2, wherein the belt tensioning device is coupled to a first roller of the at least one of the rollers, the first roller having a first center axis positioned horizontally on a first side of the and vertically below a drum center axis, and the roller assembly further includes a second roller positioned horizontally on a second side of the and vertically below the drum center axis and a third roller positioned horizontally on the second side of the and vertically above the drum center axis.

20. The separating machine of claim 19, wherein, in a first direction of travel of the belt, the first roller is immediately upstream and adjacent to the second roller, the second roller is immediately upstream and adjacent to the third roller, and the third roller is upstream of the first roller and the drum, wherein the first roller defines a first roller circumferential surface of 360°, the second roller defines a second roller circumferential surface of 360°, and the third roller defines a third roller circumferential surface of 360°, and wherein the belt contacts the first roller, at a given time, at greater than 180° of the first roller circumferential surface of the first roller, the belt contacts the second roller, at the given time, at approximately 90° of the second roller circumferential surface, and the belt contacts the third roller, at the given time, at greater than 90° and less than 180° of the third roller circumferential surface.

\* \* \* \* \*